Jan. 18, 1966 AN WANG 3,230,542
DATA RECORDING SYSTEM
Filed Aug. 19, 1963 2 Sheets-Sheet 1
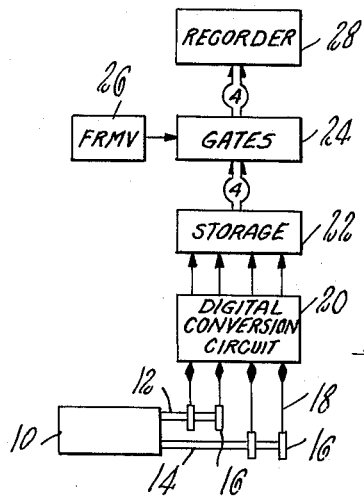
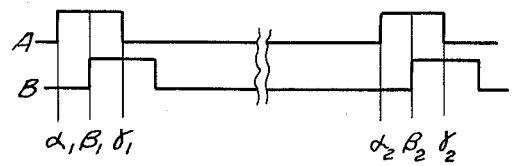
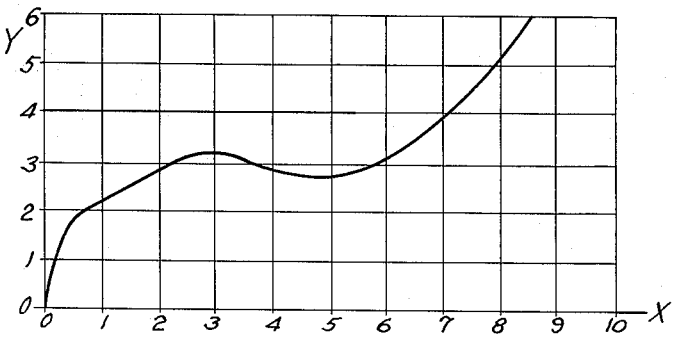
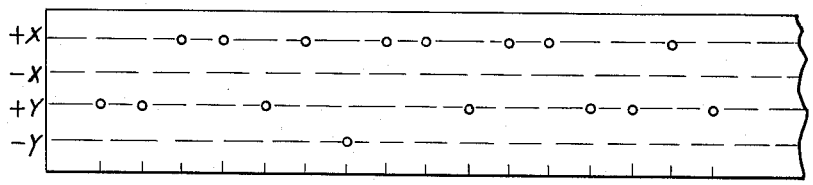
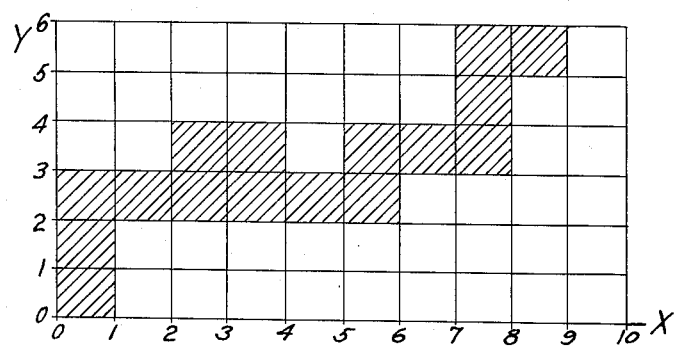

United States Patent Office 3,230,542
Patented Jan. 18, 1966

3,230,542
DATA RECORDING SYSTEM
An Wang, Lincoln, Mass., assignor to Wang Laboratories Inc., East Natick, Mass., a corporation of Massachusetts
Filed Aug. 19, 1963, Ser. No. 302,850
9 Claims. (Cl. 346—33)

This invention relates to data recording systems and more particularly to apparatus for recording in digital form analog input data.

In research and development fields, and production testing and quality control, more and more tests are being made on samples to study and/or verify the correlation between the constituents, ingredients, environmental conditions, process variables, and the end results. Samples can be fibres, papers, plastics, metals, solid fuels, or natural phenomena measured using suitable transducers. The results may be certain physical characteristics, or some observable reactions. A large part of this data is presently being collected on strip chart recorders with analyses being done after gathering information in recorded form. With the increasing volume of this test data and the emphasis placed on the results of their analyses, the old method of manual analysis of chart curves is very slow and costly, especially when cross references between several variables are necessary. The recent advent of digital data logging systems solved part of the problem by recording the variables digitally, in printed form, on punched paper tape or on magnetic tape. Because of the necessity for recording the absolute value of the variable at each logging point, however, assuming a three decade number for each value measured, twenty-four bits are necessary for each point of a two variable curve. Also, because of the time element involved in recording, the use of the relatively slow and less expensive paper tape for digital recording of the absolute value of strip chart data is virtually eliminated, except for very infrequent samplings. There is also a speed limitation for recording the absolute data on magnetic tape, because there are many tests which can be completed at rates faster than the ability of equipment to record this absolute information.

Accordingly, an object of this invention is to provide novel and improved apparatus for converting analog data as produced at the output of a system under test into digital form suitable for processing by digital computers.

Another object of the invention is to provide novel and improved analog to digital real time data conversion apparatus.

Another object of the invention is to provide a novel and improved data recording system which avoids certain speed limitations and data processing difficulties of prior art systems.

Still another object of the invention is to provide novel and improved apparatus for directly converting analog data from a plurality of inter-related variables into an accurate digital record suitable for processing by digital computers.

Other objects, features and advantages of the invention will be seen as the following description of a preferred embodiment thereof progresses, in conjunction with the drawings, in which:

FIG. 1 is a block diagram of analog to digital data conversion and recording apparatus constructed in accordance with the invention used in conjunction with a tensile strength testing device;

FIG. 2 is a diagram indicating the nature of the output signals applied to the data conversion apparatus;

FIG. 4 is a diagram indicating a curve illustrating the nature of typical input data from related variables that is processed by the apparatus of the invention;

FIG. 5 is a tape which has been punched by the apparatus of the invention to record the data represented by the curve shown in FIG. 4; and FIG. 6 is a diagram indicating the nature of the data obtained from the tape shown in FIG. 5.

Figure 3:
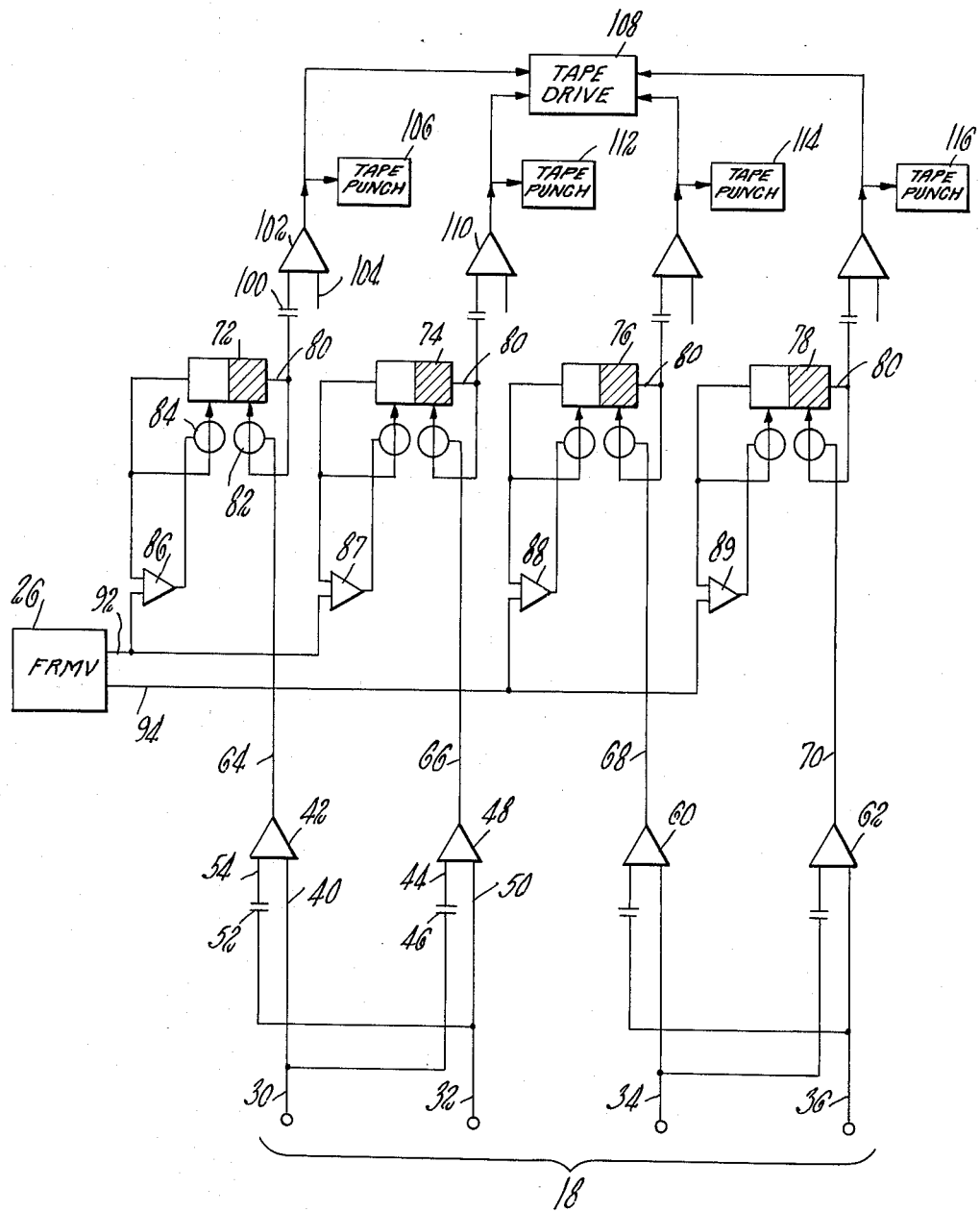
FIG. 3 is a logical diagram of the circuitry employed in the analog to digital conversion and recording apparatus of FIG. 1.

With reference to FIG. 1, there is shown in block form an analog data generator 10 which may be a tensile strength testing device of the type manufactured by Instron Engineering Corporation, for example. Other types of data generators, of course, may also be used. The generator 10 has two output shafts 12, 14. The rotation of each shaft is a function of a variable being measured. For example, the rotation of shaft 12 may be directly related to the force applied to a textile strand under test, and the rotation of the shaft 14 directly related to the elongation of that strand.

Mounted on each shaft 12, 14 are a pair of signal generating devices 16 arranged so that they produce during each revolution of the shaft 12 or 14 two substantially square wave signal trains on lines 18, the pulse portions of which preferably are out of phase by 180° as shown in FIG. 2. The cycle of each square wave train is a function of a predetermined change in the analog rotation of the coupled tester shaft and proportioned so that each cycle of the square wave train is equal to a predetermined amount of change ("increment") of the variable being measured. The system may be arranged so that the pulse lengths are equal to, or entirely different from, the intervals between pulses. However, corresponding pulses in the two trains produced by each analog variable should overlap and preferably the two pulses are of equal length. The duration of the pulses and amount of overlap is a function in part of the signal conversion coupled to these outputs. Each square wave signal generator 16 may include, for example, an apertured mask which is fixed to and rotates with the shaft 12 or 14 and a sensor which produces an output signal during the interval or intervals that it is aligned with the mask aperture(s) during each revolution of the shaft.

The square wave output signals on lines 18 from each shaft are combined in the logical circuitry 20 to generate unique signals indicative of the sensed increment of change of the variable and the direction of that change. These unique signals are stored in a flip-flop register 22 and then transferred through gates 24 under the control of free running multivibrator 26 in a synchronized manner for actuating recorder 28. That recorder acts on a record medium such as a paper tape or a magnetic tape and records the gated signals in form compatible for use as an input to a digital computer. While the apparatus will be described in conjunction with a tape punch, it will be understood that other types of recording devices may also be utilized in the practice of the invention.

Signal train conversion and tape punch control circuitry is shown in logical block form in FIG. 3. In that figure output signals from the two sensors 16 mounted on shaft 12 are applied to inputs 30, 32, while the outputs from the two sensors mounted on shaft 14 are applied to inputs 34, 36. Connected to line 30 is a conditioning input 40 for gating amplifier 42 and a gating input 44 (connected through capacitor 46) for gating amplifier 48. Input 32 is similarly connected to the conditioning input 50 of amplifier 48 and through capacitor 52 to the gating input 54 of amplifier 42. It will be seen that the inputs 34, 36 are similarly connected to the inputs of amplifiers 60 and 62.

With reference to FIG. 2, assume the square wave train A is applied to input 30 and the square wave train B is applied to input 32. As the shaft moves forward through the $\alpha_1$ position, the A signal rises to apply a conditioning input via line 30 to amplifier 42 and a positive pulse coupled through capacitor 46 to gating input 44 of amplifier 48. However, as the B signal is down at $\alpha_1$ position, input 50 is not conditioned and there is no response from amplifier 48. Assuming the shaft 12 rotates forward toward $\beta_1$ position, when that position is reached the B signal rises and this transition on line 32 is coupled through capacitor 52 to gating input 54 and produces an output pulse from amplifier 42 on line 64. Further rotation of the tester shaft 12 will cause the signal train A to fall at $\gamma_1$ position but no output is produced as the polarity of the pulse coupled through capacitor 46 to amplifier 48 is negative. With continued forward rotation of shaft 12, another output would be produced at the $\beta_2$ position.

However, should the analog input reverse the direction of rotation of the shaft 12, after it passed the $\gamma_1$ position, when the shaft reaches the $\gamma_1$ position the A signal will rise, producing a positive transition that is coupled by capacitor 46 to input 44 of amplifier 48. As the B signal is up at this position, providing a conditioning level on line 50 to amplifier 48, the signal transition at the gating input 44 produces an output on line 66. Thus each output pulse on line 64 is a digital indication of an increment of forward rotation of shaft 12 and each output pulse on line 66 is a digital indication of cancellation of an increment of forward rotation by backward rotation.

Thus it will be seen that each increment of analog information is translated into a digital pulse which is indicative of the direction of rotation of the change in the increment. For example, each increment of positive rotation of the shaft 12 produces an output pulse on line 64 and each increment of negative rotation produces an output pulse on line 66. Similarly, output pulses indicative of forward and backward increments of rotation of shaft 14 are produced on lines 68 and 70.

Each output pulse indicative of an increment of analog information is stored in the register that includes 72, 74, 76, 78. The right side of each flip-flop, in the condition shown in FIG. 3, is conducting and provides a level on line 80 that conditions input gate 82. With the gating of a pulse on line 64, for example, the pulse is passed through gate 82 to trigger the flip-flop 72 to the opposite state in a pulse storage operation. The flip-flop, in this opposite or storage state, provides a conditioning level that is applied to input gate 84 and also to amplifier 86. It will be noted that a pulse transferred through gates 48, 60 and 62 produces the same response in the corresponding flip-flops 74, 76, 78. Thus, flip-flops 72 and 74 store increment indications from analog input shaft 12 and flip-flops 76 and 78 store increment indications from analog input shaft 14.

Amplifier 86 and corresponding amplifiers 87–89 are connected to the outputs of free running multivibrator 26, amplifiers 86 and 87 being connected to output line 92 and amplifiers 88 and 89 being connected to the output line 94. When the multivibrator produces a pulse on line 92, amplifier 86, if its other input is conditioned by the flip-flop being in the storage state, pulses the conditioned input gate 84 of the connected flip-flop to trigger that flip-flop to its original (non-storage) state. This triggering produces a pulse transition on the output line 80 which is coupled through capacitor 100 as a gating input to amplifier 102 to gate the signal from the conditioning input 104 to operate tape punch 106 of recorder 28 and after the operation of the tape punch to operate tape drive 108 of the recorder. Similarly, should flip-flop 74 to be in the storage state when line 92 is pulsed the stored increment indication (shaft 12 backward) will be gated through amplifier 110 to operate tape punch 112 and tape drive 108. (The multivibrator frequency is proportioned so that the readout pulse on line 92 occurs substantially more frequently than is the possible occurrence of two analog increment signals from shaft 12.)

In like manner, when line 94 is pulsed any stored increment indication from shaft 14 is gated out from flip-flop 76 or 78 to operate the connected tape punch 114 or 116 and the tape drive 108. This multivibrator gating control thus insures the separate recording of analog increment indications from shafts 12 and 14, even though those indications may be generated at the same instant of time.

Each tape punch 106, 112, 114, 116 operates on a different channel of the tape. In certain applications data from four different analog inputs may be recorded using only three active recorder channels, three of the analog increments being recorded in assigned channels and the recorder being stepped with the presence of the fourth increment being indicated by a recorder advance tape without any increment record being made in a channel. The record for each step has one increment indication of a plurality of inter-related analog variables recorded. The resulting record is a compact store of inter-related data in form directly useable as an input to a digital computer. The logic for generating this record is simple, and hence relatively inexpensive. Further, it is easily compatible with error checking circuitry.

The nature of the generated record may perhaps best be understood with reference to an illustrative analog curve shown in FIG. 4 indicating the inter-relation of two variables. FIGURE 4 has been marked off to indicate the increments of predetermined value in which terms the data is represented by this curve recorded in digital form directly from the analog output of the tester or other device. A four channel tape is shown in FIG. 5 of the type that might be employed with the logic shown in FIG. 3. The inter-related variable data graphically indicated in FIG. 4 is recorded on the tape shown in FIG. 5. The accuracy of the analog to digital conversion is a function of the selected increment size, and the bounds of the possible data values recorded on the tape in FIG. 5 are indicated in FIG. 6. It will be noted that the data of the curve of FIG. 4 passes through each rectangle that is shaded in FIG. 6. Thus it will be seen that an analog curve can be defined completely by recording each X and Y incremental crossing, and the direction (plus or minus) of that crossing, whereby two binary bits define each point of the curve that crosses the coordinate increment lines. From this record a curve can be reconstructed to re-create the original curve within one unit increment of the original curve.

Two types of errors appear on the reconstructed curve. One is attributable to the discrete increments, due to the quantizing process, and this error can be minimized either by reducing the increment size, or by averaging several points in the data processing operation. The other error is due to the fact that an increment is recorded only after a full increment is reached, and this error can be minimized by displacing the reconstructed curve by plus half increment in both the X and the Y axes. Bearing in mind that such manipulations of data can be easily handled on a general purpose computer, it will be seen that this form of data recording preserves the original data in its simplest form, digitally, and yet, by virtue of its repetitive sampling in both co-ordinates, preserves the statistical nature of the original data.

Three variable functions of time can be recorded as X or Y or Z, + or —, and additional variables can similarly be handled with corresponding plural phase clocks employed to resolve the timing sequences of simultaneously occurring increment signals. With the apparatus of the invention the data from a test is immediately available at the end of the test for processing on computers, and the cost of data collection can be minimized. Also, the same data can be used for several different types of analyses and is available for rerun as new analyses are desired.

While a specific embodiment of the invention which translates and records in digital form the inter-relation of data directly from two analog variables, and modifications thereof have been shown and described, further modifications of the disclosed embodiment will be obvious to those skilled in the art and therefore it is not intended that the invention be limited to that embodiment or to details thereof and departures may be made therefrom within the spirit and scope of the invention as defined in the claims.

What is claimed is:

1. Apparatus for providing a record in digital form of analog input information from a plurality of related variables comprising means to generate an output signal in response to each change of predetermined magnitude in each of said analog input variables, recording means including a record medium having a plurality of channels of indeterminate length corresponding to said plurality of variables, means to actuate said recording means to record digital indications of said output signals in the channels of said record medium corresponding to the variables which cause the generation of the output signals, and means to step said recording means in response to each said output signal so that only one digital indication is recorded at any one point along the length of said record medium.

2. Apparatus for providing a record in digital form of analog input information from a plurality of related variables comprising signal storage means corresponding to each variable, means to store in the corresponding storage means the signal generated upon the detection of a change of predetermined magnitude in the corresponding variable, recording means including a record medium having a plurality of channels of indeterminate length corresponding to said plurality of variables, gating means controlling the translation of signals from said storage means to said recording means, means to actuate said gating means to translate only one signal from said storage means to said recording means at a time, means to actuate said recording means to record digital indications of said output signals in the channels of said record medium corresponding to the variables which cause the generation of the output signals, and means to step said recording means in response to each said output signal so that only one digital indication is recorded at any point along the length of said record medium.

3. Apparatus for providing a record in digital form of analog input information from a plurality of related variables as a function of output signals generated in response to each change of predetermined magnitude in each of said analog input variables, comprising recording means having a plurality of channels corresponding to said plurality of variables for recording digital indications on a record medium, means to actuate said recording means to record an indication of each output signal in the channel of said record medium corresponding to the variable which caused the generation of that output signal, and means to change the relative positions of said recording means and said record medium in response to each said output signal so that only one indication is recorded at any one position on said record medium.

4. Apparatus for providing a record in digital form of analog input information from a plurality of related variables comprising means for generating an output signal indicative of direction of variable change in response to each incremental change in said analog input variables, recording means having a plurality of channels of indeterminate length for recording digital indications on a record medium, each channel corresponding to one of said variables, means to actuate said recording means to record an indication of each output signal in the channel of a record medium corresponding to the variable which caused the generation of that output signal, and means to step said recording means in response to each said output signal so that only one indication is recorded at any one point along the length of said record medium.

5. The apparatus as claimed in claim 4 wherein output signal generating means provides two out of phase signals and includes phase sensing means and means to apply said out of phase signals to said sensing means to produce said increment direction indication.

6. Apparatus for providing a record in digital form of analog input information from a plurality of related variables comprising signal storage means corresponding to each variable, logic circuitry for generating and storing in the corresponding storage means a signal indicative of the direction of variable change upon the detection of a change of predetermined magnitude in the corresponding variable, recording means including a record medium having a plurality of channels of indeterminate length corresponding to said plurality of variables, gating means controlling the translation of signals from said storage means to said recording means, means to actuate said gating means to translate only one signal from said storage means to said recording means at a time, means to actuate said recording means to record digital indications of said output signals in the channels of said record medium corresponding to the variables which caused the generation of the output signals, and means to step said recording means in response to each said output signal so that only one digital indication is recorded at any point along the length of said record medium.

7. Apparatus for recording a plurality of correlated continuous variable functions comprising means to generate an output signal in response to each incremental change of predetermined magnitude of each variable, each said output signal including information as to the direction of that incremental change, recording means having a plurality of channels corresponding to said variables for recording digital indications on a record medium, means to actuate said recording means to record an indication of each output signal in the channel of said record medium corresponding to the variable which caused the generation of that output signal, and means to change the relative positions of said recording means and said record medium in response to each said output signal so that only one indication is recorded at any one position on said record medium.

8. Apparatus for providing a record in digital form of analog input information from a plurality of related variables as a function of output signals generated in response to each change of predetermined magnitude in each of said analog input variables, comprising recording means having a plurality of channels corresponding to said plurality of variables for recording digital indications on a record medium, means to actuate said recording means to record an indication of each output signal in the channel of said record medium corresponding to the variable which caused the generation of that output signal, a plural phase clock for controlling the recording of output signals produced in response to incremental changes that occur substantially simultaneously, and means to change the relative positions of said recording means and said record medium in response to each said output signal so that only one indication is recorded at any one position on said record medium.

9. Apparatus for providing a record in digital form of analog input information from a plurality of related variables as a function of output signals generated in response to each incremental change of predetermined magnitude in each of said analog input variables comprising recording means having a plurality of channels corresponding to said plurality of variables for recording digital indications on a record medium, means to actuate said recording means to record an indication of each said output signal in the channel of said record medium corresponding to the variable which caused the generation of that output signal, means to change the relative positions of said recording means and said record medium in response to each said output signal and means to discriminate between output signals from two different variables generated coincidentally in time for recording said indications of each of said output signals at different positions along the length of said record medium.

References Cited by the Examiner

UNITED STATES PATENTS

| | | | |
|---|---|---|---|
| 2,748,487 | 6/1956 | Zimmermann | 235—61.6 |
| 2,931,566 | 4/1960 | Strassner | 235—61.6 |
| 2,953,777 | 9/1960 | Gridley | 340—347 |
| 2,965,431 | 12/1960 | Milmore | 340—347 |
| 2,968,793 | 1/1961 | Bellamy | 340—172.5 |
| 2,987,366 | 6/1961 | Meyers | 346—50 |
| 2,996,348 | 8/1961 | Rosenberg | 346—33 |
| 3,003,142 | 10/1961 | Wolinsky | 340—347 |
| 3,071,762 | 1/1963 | Morgan | 340—347 |
| 3,158,426 | 11/1964 | Doersam et al. | 346—20 |

LEO SMILOW, *Primary Examiner.*

LEYLAND M. MARTIN, *Examiner.*